United States Patent
Choi et al.

(10) Patent No.: US 10,331,342 B2
(45) Date of Patent: Jun. 25, 2019

(54) MOBILE TERMINAL AND CONTROL METHOD THEREFOR

(71) Applicant: LG ELECTRONICS INC., Seoul (KR)

(72) Inventors: Minkyu Choi, Seoul (KR); Changkyoon Kim, Seoul (KR); Eulim Sull, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,186

(22) PCT Filed: May 4, 2016

(86) PCT No.: PCT/KR2016/004727
§ 371 (c)(1),
(2) Date: Jan. 5, 2018

(87) PCT Pub. No.: WO2017/022931
PCT Pub. Date: Feb. 9, 2017

(65) Prior Publication Data
US 2018/0196596 A1 Jul. 12, 2018

Related U.S. Application Data

(60) Provisional application No. 62/201,606, filed on Aug. 6, 2015.

(51) Int. Cl.
*G06F 3/041* (2006.01)
*G06F 3/0488* (2013.01)
(Continued)

(52) U.S. Cl.
CPC .......... *G06F 3/04886* (2013.01); *G06F 3/041* (2013.01); *G06F 3/0481* (2013.01);
(Continued)

(58) Field of Classification Search
CPC ...... G06F 3/041; G06F 3/0481; G06F 3/0484; G06F 3/04886; G06F 3/1431; H04M 1/247; H04W 4/80
(Continued)

(56) References Cited

U.S. PATENT DOCUMENTS

| 2011/0165841 | A1* | 7/2011 | Baek ........................ H04L 67/10 455/41.2 |
| 2012/0060109 | A1 | 3/2012 | Han et al. |
| 2013/0328747 | A1* | 12/2013 | Yoneda .................. G06F 3/1423 345/3.1 |

FOREIGN PATENT DOCUMENTS

| JP | 2013-179553 A | 9/2013 |
| KR | 10-2010-0051900 A | 5/2010 |

(Continued)

*Primary Examiner* — Tony O Davis
(74) *Attorney, Agent, or Firm* — Birch, Stewart, Kolasch & Birch, LLP

(57) ABSTRACT

The present invention relates to a mobile terminal for controlling the screen output state of at least one external device outputted on a display device, and a control method therefor. To achieve the aforesaid objective or other objectives, an aspect of the present invention provides a mobile terminal comprising: a display unit including a first display area and a second display area; a wireless communication unit for transmitting/receiving signals to/from a display device; and a control unit for performing control so as to output, to the first display area, the current screen division state of the at least one external device being outputted on the display device, and to output, to the second display area, at least one screen division option for the at least one external device.

9 Claims, 22 Drawing Sheets

(51) Int. Cl.
  *G06F 3/0481*   (2013.01)
  *G06F 3/0484*   (2013.01)
  *H04M 1/247*   (2006.01)
  *H04W 4/80*   (2018.01)
  *G06F 3/14*   (2006.01)

(52) U.S. Cl.
  CPC .......... *G06F 3/0484* (2013.01); *G06F 3/1431* (2013.01); *H04M 1/247* (2013.01); *H04W 4/80* (2018.02)

(58) Field of Classification Search
  USPC .......................................... 345/170–176, 690
  See application file for complete search history.

(56) References Cited

FOREIGN PATENT DOCUMENTS

| | | |
|---|---|---|
| KR | 10-2012-0025929 A | 3/2012 |
| KR | 10-2014-0047808 A | 4/2014 |
| KR | 10-2015-0048660 A | 5/2015 |

\* cited by examiner

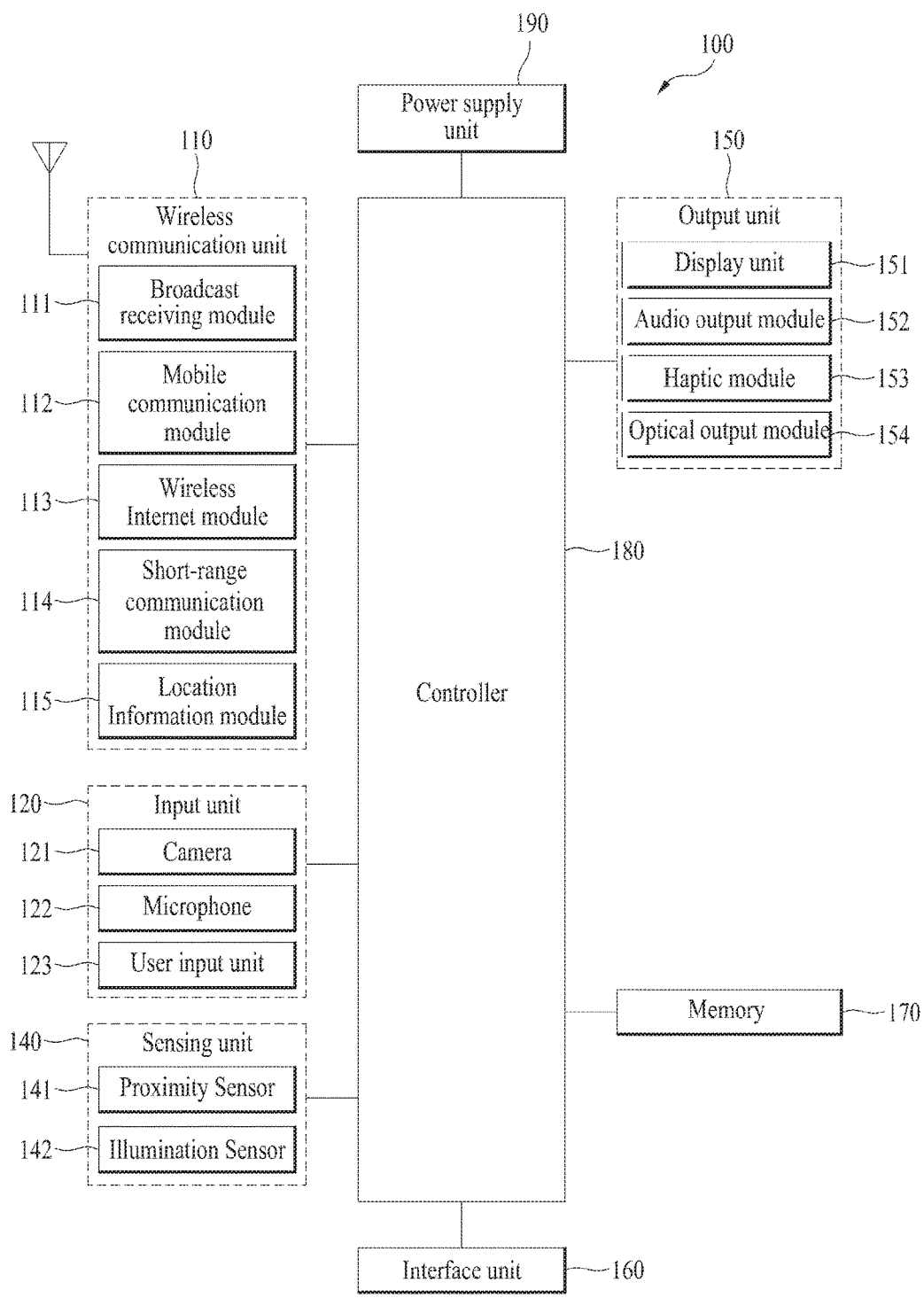

FIG. 17
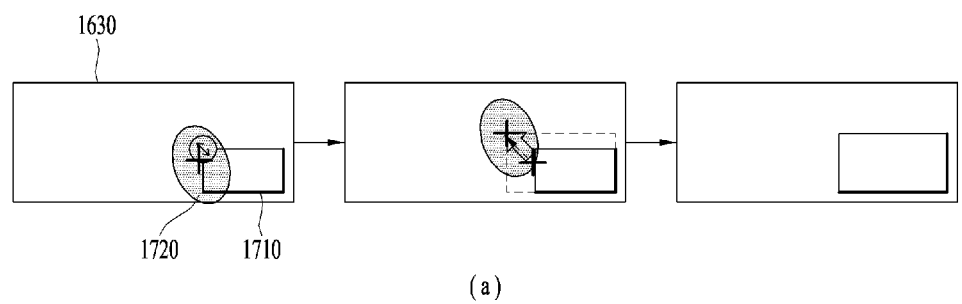
(a)
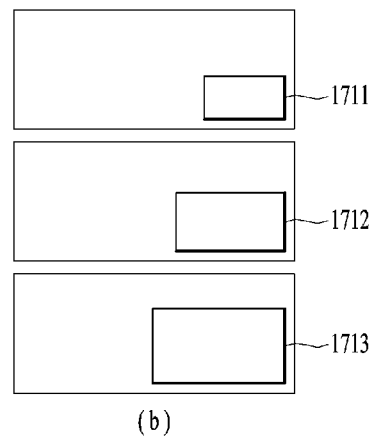
(b)

FIG. 18
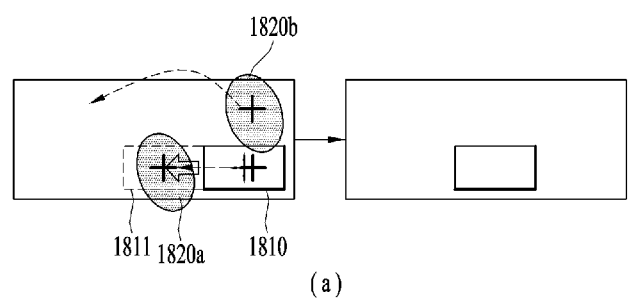
(a)
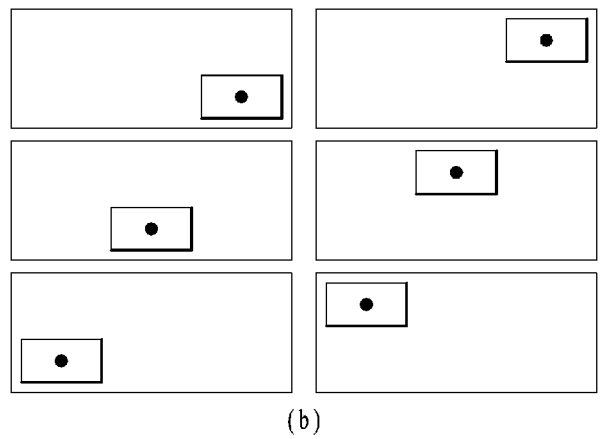
(b)

MOBILE TERMINAL AND CONTROL METHOD THEREFOR

CROSS REFERENCE TO RELATED APPLICATIONS

This application is the National Phase of PCT International Application No. PCT/KR2016/004727, filed on May 4, 2016, which claims priority under 35 U.S.C. 119(e) to U.S. Provisional Application No. 62/201,606, filed on Aug. 6, 2015, all of which are hereby expressly incorporated by reference into the present application.

TECHNICAL FIELD

The present invention relates to a mobile terminal for controlling a state of outputting a screen of at least one external device, which is output on a display device, and a method of controlling the same.

BACKGROUND ART

Terminals may be divided into mobile/portable terminals and stationary terminals according to mobility. Mobile terminals may be divided into handheld terminals and vehicle mounted terminals according to whether or not a user can directly carry the terminal.

The functions of the mobile terminals are diversified. For example, the mobile terminals may include functions such as data and voice communication, photographing and filming through a camera, voice recording, playback of music files through a speaker system and output of images or video on a display. Some mobile terminals may further perform an electronic gaming function or multimedia player function. In particular, new mobile terminals may receive multicast signals for providing visual content such as broadcasts, video or television programs.

As the functions of the terminals are diversified, the terminals are implemented in the form of multimedia players having complex functions such as photographing or filming, playback of music or video files or reception of games and broadcast programs.

In order to support and increase the functions of the terminals, improvement of the structure and/or software of the terminals may be considered.

Meanwhile, various methods of using content such as video, music, and photos, which has utilized on a smartphone, through a display device such as a TV have been developed. For example, while YouTube video may be played on a TV, a computer screen may be output.

At this time, there is a need for various methods of conveniently and efficiently controlling the screen states of a plurality of external devices while the screens of the plurality of external devices are output on a display device.

DISCLOSURE

Technical Problem

An object of the present invention is to solve the above-described problems and the other problems. Another object of the present invention is to provide a mobile terminal for controlling split of a screen of a display device connected to the mobile terminal, and a method of controlling the same.

Another object of the present invention is to provide a mobile terminal for variously controlling the screen output forms of a plurality of external devices through a screen control application of a display device, which is executed on the mobile terminal, and a method of controlling the same.

Technical Solution

The object of the present invention can be achieved by providing a mobile terminal including a display unit including a first display region and a second display region, a wireless communication unit configured to transmit and receive a signal to and from a display device, and a controller configured to perform control to output a current split-screen state of at least one external device output on the display device in the first display region and to output at least one split-screen option for the at least one external device in the second display region.

According to another aspect of the present invention, the current split-screen state of the first display region may include at least one of an external device region indicating an output state of the at least one external device on the display device, a sound region indicating a sound source of the display device, and a screen option region of the at least one external device.

According to another aspect of the present invention, the controller may perform control to transmit a control signal for changing an input position of the at least one external device to the display device through the wireless communication unit, when an input signal for the external device region is sensed.

According to another aspect of the present invention, the controller may perform control to transmit a control signal for changing a sound source device in the display device through the wireless communication unit, when an input signal for the sound region is sensed.

According to another aspect of the present invention, when an input signal for the screen option region is sensed, the controller may perform control to output an input change menu and an aspect ratio menu of an external device corresponding to an external device region in which the input signal is sensed.

According to another aspect of the present invention, the controller may perform control to transmit a control signal for changing an aspect ratio of the at least one external device to the display device through the wireless communication unit, when an input signal for the aspect ratio menu is sensed.

According to another aspect of the present invention, the controller may perform control to transmit a control signal for changing split-screen of the at least one external device to the display device through the wireless communication unit, when an input signal for selecting one of the at least one split-screen option is sensed.

According to another aspect of the present invention, the controller may perform control to output the first display region and the second display region for controlling an output form of the at least one external device while mirroring content of the at least one external device on the display device.

According to another aspect of the present invention, the wireless communication unit may transmit and receive a screen control signal to and from the display device using a Bluetooth method.

In another aspect of the present invention, provided herein is a method of controlling a mobile terminal including outputting a current split-screen state of at least one external device connected to a display device in a first display region and outputting a split-screen option of the at least one external device in a second display region, transmitting a control signal of at least one of an output position, a sound source, an input source and an aspect ratio of at least one external device output on the display device to the display device, when an input signal for the first display region is sensed, and transmitting, to the display device, a signal for controlling a split-screen form of at least one external device output on the display device, when an input signal for the second display region is sensed.

Advantageous Effects

The mobile terminal and the method of controlling the same according to the present invention have the following effects.

According to at least one of the embodiments of the present invention, it is possible to easily control the screens of a variety of content which is being output on a display device through a mobile terminal.

According to at least one of the embodiments of the present invention, it is possible to easily control the content of a plurality of external devices, which is being output on a display device, on a mobile terminal according to convenience of a user.

According to at least one of the embodiments of the present invention, a mobile terminal can control output of a screen of a display device through Bluetooth communication, thereby reducing power consumption.

Additional scope of applicability of the present invention will become apparent from the detailed description given hereinafter. However, since various changes and modifications within the spirit and scope of the invention may be clearly understood by those skilled in the art, a particular embodiment such as the following detailed description and preferred embodiment of the present invention are to be understood as given by way of illustration only.

DESCRIPTION OF DRAWINGS

FIG. 1a is a block diagram illustrating a mobile terminal related to the present invention.

FIG. 17 is a diagram showing an example of controlling an aspect ratio option output in the second display region in the embodiment of FIG. 16.

FIG. 18 is a diagram showing an example of controlling an aspect ratio option output in the second display region in the embodiment of FIG. 16.

BEST MODE

Figure 1B:
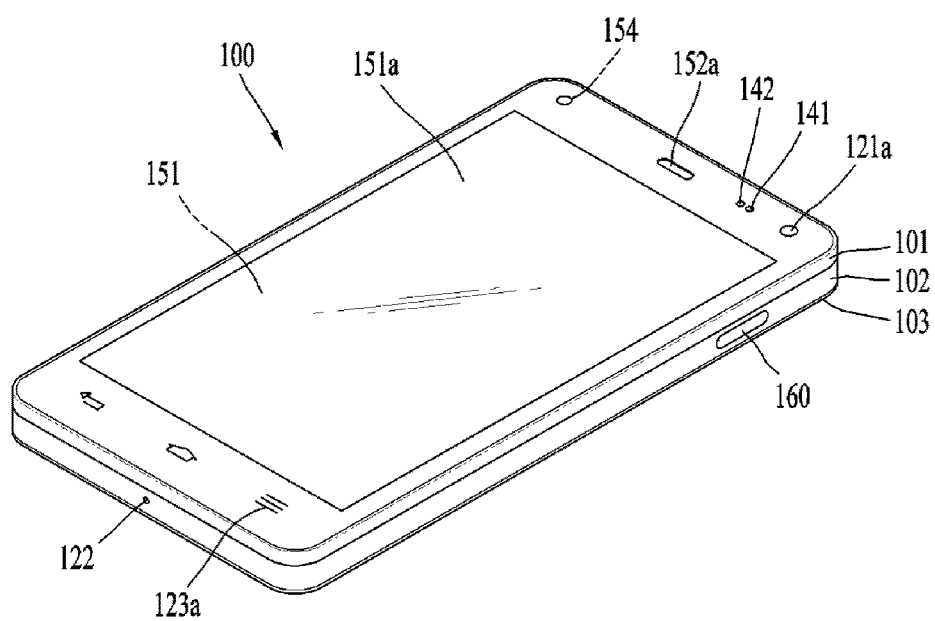
FIGS. 1b and 1c are diagrams showing the concepts of an example of a mobile terminal related to the present invention when viewed in different directions.

Exemplary embodiments of the present invention will be described below in detail with reference to the accompanying drawings in which the same reference numbers are used throughout this specification to refer to the same or like parts and a repeated description thereof will be omitted. The suffixes "module" and "unit" of elements herein are used for convenience of description and thus can be used interchangeably and do not have any distinguishable meanings or functions. In describing the present invention, a detailed description of known functions and configurations will be omitted when it may obscure the subject matter of the present invention. The accompanying drawings are used to aid in ease of understanding the technical idea of the present invention and it should be understood that the idea of the present invention is not limited by the accompanying drawings. The idea of the present invention should be construed to extend to any alterations, equivalents and substitutions besides the accompanying drawings.

It will be understood that, although the terms first, second, etc. may be used herein to describe various elements of the present invention, these terms are only used to distinguish one element from another element and, order, or sequence of corresponding elements are not limited by these terms.

It will be understood that when one element is referred to as being "connected to" or "coupled to" another element, one element may be "connected to" or "coupled to", another element via a further element although one element may be directly connected to or directly access to another element.

A singular representation may include a plural representation unless context clearly indicates otherwise.

It will be understood that the terms 'comprise', 'include', etc., when used in this specification, specify the presence of several components or several steps and part of the components or steps may not be included or additional components or steps may further be included.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. However, the configurations according to the embodiments of this specification may also be applied to stationary terminals such as digital TVs, desktop computers, digital signage and the like, except for configurations applied to only mobile terminals.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
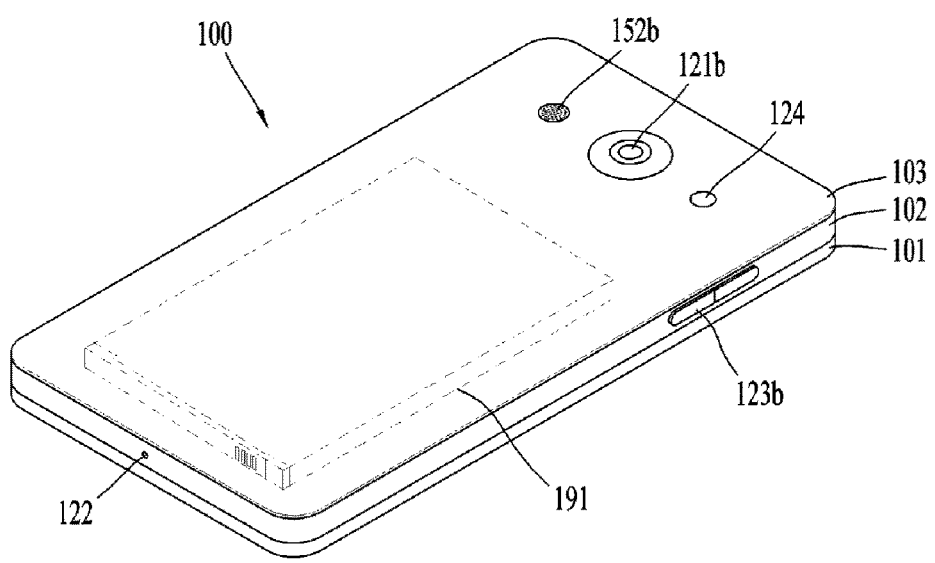

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor. The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen.

The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image. The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like.

The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device.

The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body. The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen. Hereinafter, embodiments related to a control method which may be implemented in a mobile terminal having the above-described configuration will be described with reference to the accompanying drawings. It will be apparent to those skilled in the art that the present invention may be implemented in a particular form without departing from the spirit or scope of the invention.

Hereinafter, FIGS. 2 to 22 show a method of controlling a screen output form of a display device for outputting content of at least one external device through a mobile terminal. The display device may output content received from an external device using a mirroring or casting method. For example, the display device may include various devices including a display unit such as a TV or a monitor. In addition, for example, the external device may include various digital devices such as PCs, PDAs, tablets, smartphones and dongles. For example, a dongle may be installed in a display device. In addition, mirroring refers to a method of transmitting a screen of an external device to a display device and casting refers to a method of transmitting the Internet address and playback information of content uploaded to a cloud or online to a display device. In the present invention, assume that various content transmission methods of an external device, such as mirroring or casting, are applicable.

Hereinafter, in the present invention, assume that content of an external device is output on a display device through mirroring or casting. In addition, in the present invention, in a state of outputting a screen of an external device on a display device through casting or mirroring, a method of controlling a split form of the output screen will be described.

Figure 2:
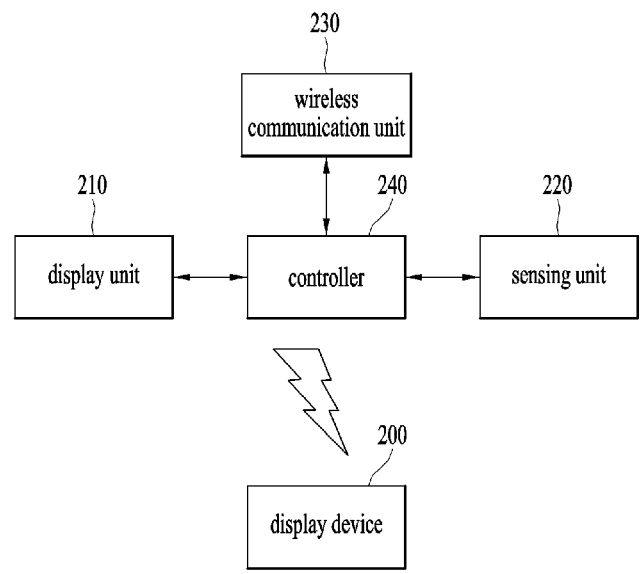
FIG. 2 is a block diagram showing a mobile terminal according to an embodiment of the present invention.

FIG. 2 is a block diagram showing a mobile terminal according to an embodiment of the present invention.

According to the present invention, the mobile terminal may include a display unit 210, a sensing unit 220, a wireless communication unit 230 and a controller 240. In addition, the modules provided in the mobile terminal are limited thereto and various modules may be further included.

The display unit 210 may display visual information. Here, the visual information may include content, applications, images, video, icons, etc. In addition, the display unit 210 may output the visual information on a screen based on a control command of the controller 240. In the present invention, the display unit 210 may be implemented by the display unit 151 of FIG. 1a. According to an embodiment of the present invention, the display unit 151 may include a first display region and a second display region.

The sensing unit 220 may sense a variety of input of a user to the mobile terminal and an environment of the mobile terminal and deliver a sensed result such that the controller 240 performs operation based on the sensed result. In the present invention, the sensing unit 520 may be implemented by the sensing unit 140 or the input unit 120 shown in FIG. 1a. In addition, according to one embodiment of the present invention, the sensing unit 220 may be implemented as a touch screen along with the display unit 210. According to an embodiment of the present invention, the sensing unit 220 may sense a variety of touch input of the user.

The wireless communication unit 230 may perform communication between the mobile terminal and the external device using various protocols and transmit and receive data. In addition, the wireless communication unit 230 may access a network by wire or wirelessly and transmit and receive digital data such as content. In the present invention, the wireless communication unit 230 may be implemented by the wireless communication unit 110 of FIG. 1a. According to one embodiment of the present invention, the wireless communication unit 230 may transmit a control signal for controlling screen output to the display device 200 and receive information on a screen state.

In addition, according to one embodiment of the present invention, the wireless communication unit may transmit and receive data for screen control through Bluetooth communication with the display device and transmit and receive mirroring data through Wi-Fi Direct communication with the external device. However, the communication method is not limited thereto and various communication methods may be used.

The controller 240 may process data, control the units of the mobile terminal, and control data transmission and reception between the units. In the present invention, the controller 240 may be implemented by the controller 180 of FIG. 1a. According to one embodiment of the present invention, the controller 240 may perform control to transmit a signal for controlling output of the screen of the external device, which is being output on the display device, based on an input signal.

In one embodiment of the present invention, operations performed by the mobile terminal may be controlled by the controller 240. However, for convenience, in the drawings and the following description, such operations are described as being performed by the mobile terminal. Hereinafter, a method of controlling output of the screen of the external device, which is output on the display device, at a mobile terminal will be described through the embodiments of FIGS. 3 to 22.

Figure 3:
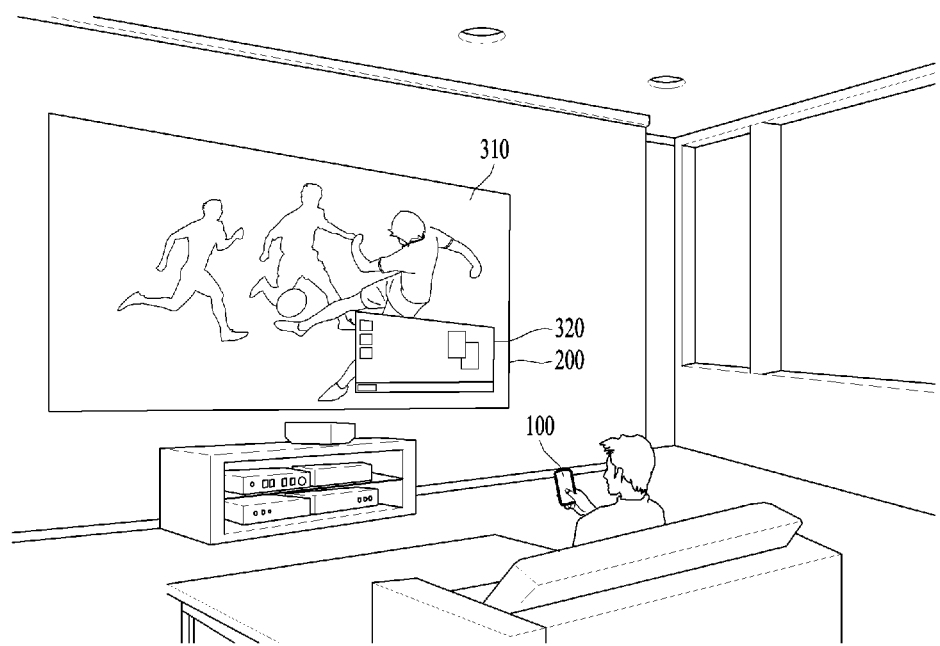
FIG. 3 is a diagram showing an example of controlling output of a screen of a display device at a mobile terminal according to an embodiment of the present invention.

FIG. 3 is a diagram showing an example of controlling output of a screen of a display device at a mobile terminal according to an embodiment of the present invention.

Conventionally, in order to control output of the screen of the display device 200, a user may perform control through a remote controller provided in the display device 200 or through a key provided in the display device 200. In addition, when output of the screen of the display device 200 is controlled, since movement of the user or device is required, there is a need for a method of controlling the screen through the mobile terminal 100 mainly used by the user.

As shown in FIG. 3, in the present invention, the user having the mobile terminal 100 receives content from two or more external devices through the display device 200. For example, the two or more external devices may be streaming devices and include Amazon Fire TV, Google Chromecast, Apple TV, etc. In addition, for example, the two or more external devices are digital devices and include PCs, PDAs, dongles, etc. For example, in the embodiment of FIG. 3, assume that the first external device 310 is Google Chromecast and the second external device 320 is a PC. For example, in the embodiment of FIG. 3, the user may perform Internet search using the PC while viewing video output on the display device 200. Meanwhile, when the dongle is installed in the display device, the display device may autonomously perform casting through the dongle.

In addition, in the present invention, assume that control of the screen output state of the display device 200 is performed by executing a screen control application on the mobile terminal 100. Hereinafter, the screen control application will be described with reference to FIGS. 4 to 21.

The screen control application executed on the mobile terminal may correspond to an application provided to control the output form of at least one external device while mirroring the content of the at least one external device on the display device. At this time, the display device and the mobile terminal may transmit and receive data using various communication methods. For example, content mirroring through a casting application executed on the mobile terminal may be performed through Wi-Fi Direct communication.

In addition, for example, screen control of the display device through the screen control application executed on the mobile terminal may be performed through Bluetooth communication in order to reduce power consumption.

Home Screen of Screen Control Application

Figure 4:
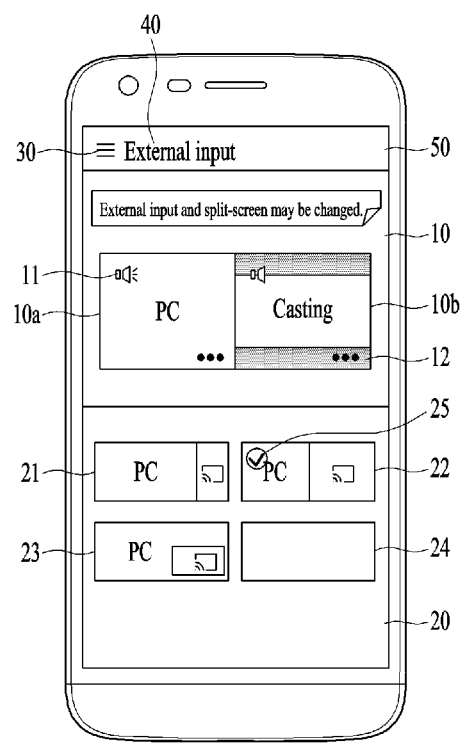
FIG. 4 is a diagram showing an example of a representative screen of a screen control application output on a display unit of a mobile terminal according to an embodiment of the present invention.

FIG. 4 is a diagram showing an example of a representative screen of a screen control application output on a display unit of a mobile terminal according to an embodiment of the present invention.

The embodiment of FIG. 4 may correspond to the representative screen output as a home screen 50 when the screen control application is executed on the mobile terminal 100. In this case, an "external input" screen is set as a default screen and another screen may be output as a representative screen according to settings.

First, the "external input" screen may be split into the first display region 10 and the second display region 20. The first display region 10 corresponds to a region showing the current screen output state of at least one external device on the display device. In addition, the second display region 20 corresponds to a region indicating a split-screen option of at least one external device.

The first display region 10 shows the state of the external device currently connected to the display device. In the embodiment of FIG. 4, the display device is connected with two external devices and the first display region 10 may output a first external device region 10a and a second external device region 10b. For example, in the embodiment of FIG. 4, assume that the first external device is a PC and the second external device is a streaming device.

In addition, the user may control sound output from the display device through the respective external device regions and the aspect ratios of the external devices. The first external device region 10a and the second external device region 10b may include a sound icon 11 and a screen control icon 12, respectively. In addition, the sound source of the external device currently output on the display device may be shown through the output form of the sound icon 11. Referring to FIG. 4, the display device may currently output sound which is being output from the first external device. In addition, change of the source device of sound output will be described with reference to FIGS. 11 and 12. In addition, the screen control icon 12 will be described with reference to FIGS. 13 and 14.

Meanwhile, the first external device region 10a and the second external device region 10b may show the external devices, which are currently being output, using various methods.

For example, as shown in FIG. 4, the names of the connected external devices may be output in the first external device region 10a and the second external device region 10b. As another example, the actually output screens of the connected external devices may be output in the first external device region 10a and the second external device region 10b.

That is, the mobile terminal may mirror the screens, which are actually output on the display device through Wi-Fi Direct communication between the mobile terminal and the display device, in the first external device region 10a and the second external device region 10b. In addition, as another example, the thumbnail images of the output screens of the connected external devices may be output in the first external device region 10a and the second external device region 10b. The second display region 20 shows a split-screen list of at least one external device connected to the display device. More specifically, the second display region 20 shows a split form of the screen currently output on the display device by the external device and a list of outputtable split-screen forms. In the embodiment of FIG. 4, the split-screen forms of the first external device and the second external device include a total of 4 split-screen forms 21, 22, 23 and 24. In addition, the split-screen form currently output on the display device may be indicated through an icon 25.

In the present invention, the aspect ratio options changeable when the number of external devices connected to the display device is 2 are described. In a first aspect ratio option 21, one external device has an aspect ratio of 16:9 and the other external device has an aspect ratio of 5:9. In addition to the aspect ratios of 16:9 and 5:9, other aspect ratios are possible.

In addition, in a second aspect ratio option 22, the two external devices are output with the same ratio. In a third aspect ratio option 23, one external device is output on the full screen and the other external device is output as a picture-in-picture (PIP) screen. In addition, in a fourth aspect ratio option 24, only one external device is output on the full screen. Change of the split-screen form will be described with reference to FIGS. 15 to 18.

Meanwhile, a menu tab 30 and a current menu 40 may be output on the upper end of the home screen 50. The menu tab 30 will be described with reference to FIG. 5. In addition, the current menu 40 corresponds to "external input".

Figure 5:
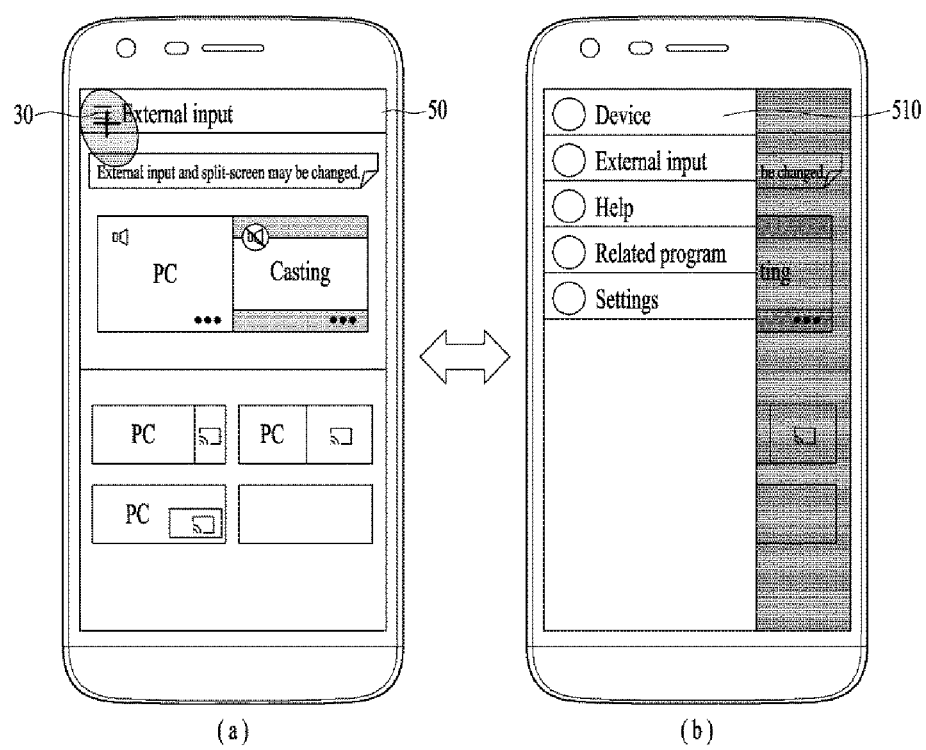
FIG. 5 is a diagram showing an example of a menu tab of a screen control application output on a display unit of a mobile terminal according to an embodiment of the present invention.

FIG. 5 is a diagram showing an example of a menu tab of a screen control application output on a display unit of a mobile terminal according to an embodiment of the present invention.

Referring to FIG. 5(a), the mobile terminal may sense touch input 30 of the menu tab 30 in a state of outputting the home screen 50. For example, touch input 30 may correspond to single touch input of the menu tab 30. In addition, touch input 30 may correspond to flicking touch or drag touch input in a right direction in one region of the home screen 50.

In this case, the mobile terminal may output a menu list 510 in correspondence with touch input 30. In addition, when input of selecting one item of the menu list 510 is sensed, the mobile terminal may perform control to output the selected menu screen while the menu list 510 disappears to the left. In addition, as shown in FIG. 5(b), while the menu list 510 is output, the home screen may not operate and thus be dimmed.

Connection to the Display Device Through Screen Control Application

Hereinafter, FIGS. 6 to 10 show a method of controlling connection with the display device when the screen control application is first executed on the mobile terminal.

Figure 6:
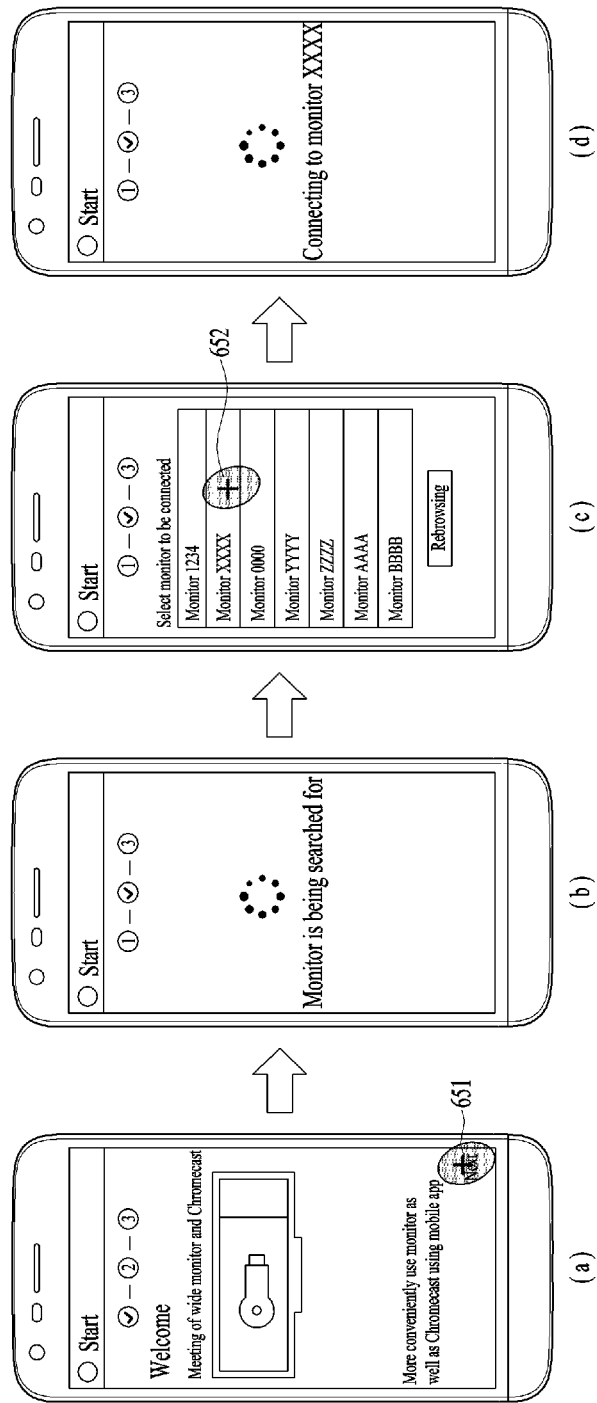
FIGS. 6 and 7 are diagrams showing an example of a method of executing a screen control application in a mobile terminal to establish connection with a display device according to an embodiment of the present invention.
Figure 7:
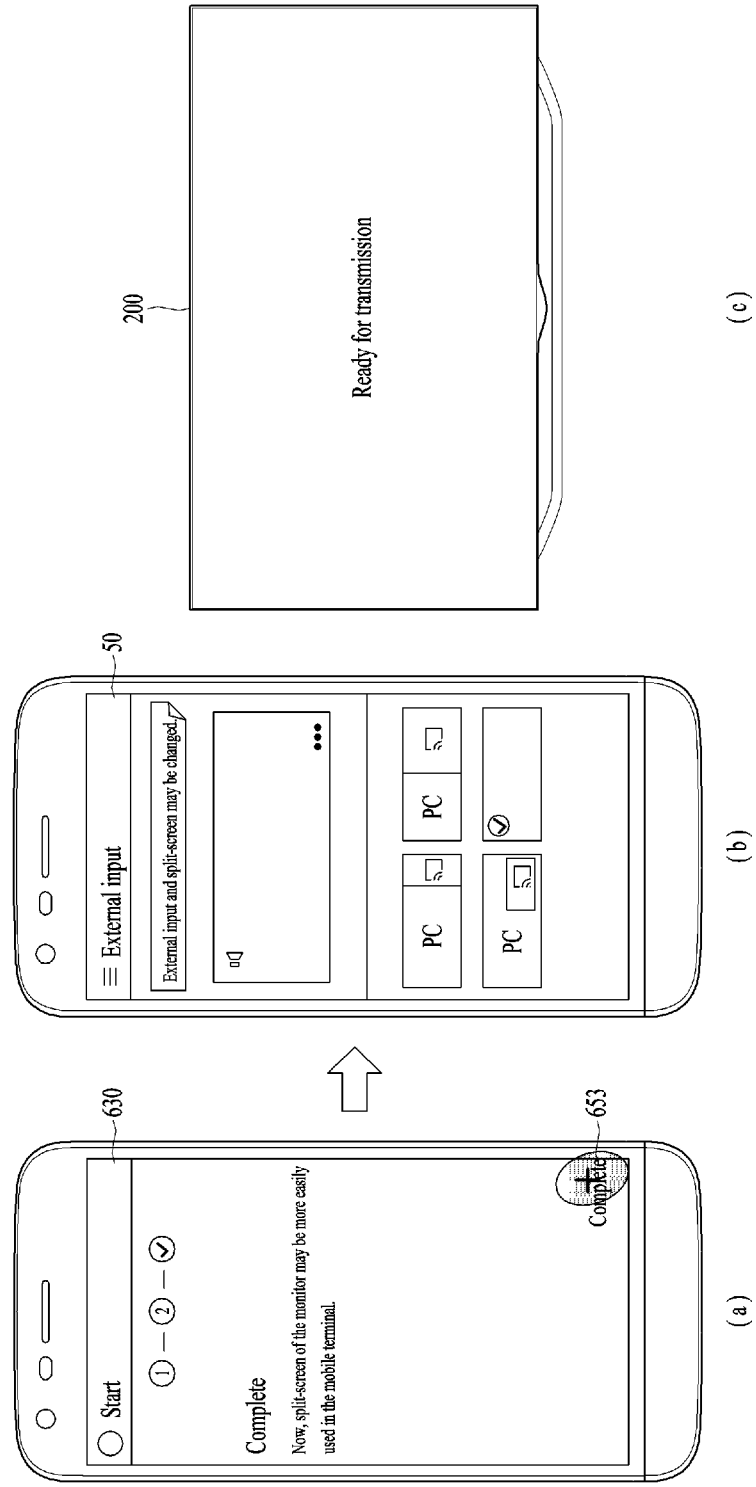

FIGS. 6 and 7 are diagrams showing an example of a method of executing a screen control application in a mobile terminal to establish connection with a display device according to an embodiment of the present invention.

Referring to FIG. 6(a), in a state of outputting a first execution screen of the screen control application, a first input signal 651 may be sensed. Here, the first input signal 651 corresponds to a signal for determining whether connection with the display device is established through the screen control application. In addition, the mobile terminal may search for connectable display devices in correspondence with the first input signal 651. At this time, wireless communication between the mobile terminal and the display device may be performed through Bluetooth communication, without being limited thereto. As shown in FIG. 6(b), the mobile terminal may output a screen showing the state of searching for the display device. Meanwhile, although not shown in FIG. 6(b), if Bluetooth communication of the mobile terminal is in an off state, a popup message may be provided.

Next, referring to FIG. 6(c), the mobile terminal may output a list of connectable display devices. In addition, when a second input signal 652 for selecting one device from the list of the connectable display devices is sensed, the mobile terminal may attempt to establish connection with the selected display device. As shown in FIG. 6(d), the mobile terminal may output a screen showing the state of establishing connection with the display device.

Referring to FIG. 7(a), when connection between the mobile terminal and the display device is completed, the mobile terminal may output a connection complete screen. At this time, when a third input signal 653 is sensed, the mobile terminal may output the home screen 50. At this time, the home screen 50 may correspond to a screen corresponding to a menu set as a default menu, as described above with reference to FIG. 4.

Meanwhile, as shown in FIG. 7(c), when connection between the mobile terminal and the display device is completed, a message indicating that connection of the display device 200 is completed may be displayed.

Figure 8:
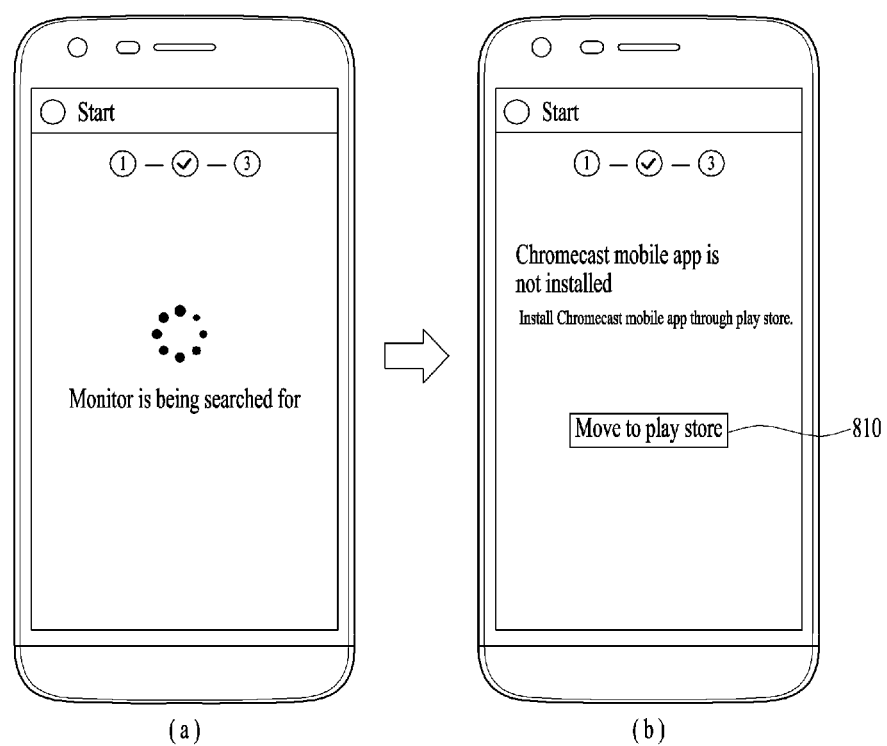
FIG. 8 is a diagram showing an example of an error occurring when a screen control application is first executed in a mobile terminal according to an embodiment of the present invention.

FIG. 8 is a diagram showing an example of an error occurring when a screen control application is first executed in a mobile terminal according to an embodiment of the present invention.

More specifically, FIG. 8 shows the case where it is determined that a streaming application is not installed on the mobile terminal while searching for the connectable display device in the embodiment of FIG. 6(b).

Referring to FIG. 8(a), the mobile terminal may determine whether the streaming application is installed on the mobile terminal while searching for connectable display devices, because the screen is only controlled through the screen control application when being output on the display device and content actually output on the display device is controlled through the streaming application.

In addition, upon determining that the streaming application is installed, the mobile terminal may perform control to output a list of connectable display devices as shown in FIG. 6(c).

Meanwhile, upon determining that the streaming application is not installed, as shown in FIG. 8(b), control may be performed such that a message indicating that the streaming application is not installed is output and an application installation icon 810 for installing the streaming application is output.

In addition, according to an input signal (not shown) for the application installation icon 810, the mobile terminal may download and install the streaming application. In this case, the mobile terminal may return to step of searching for the connectable display devices shown in FIG. 8(a).

Figure 9:
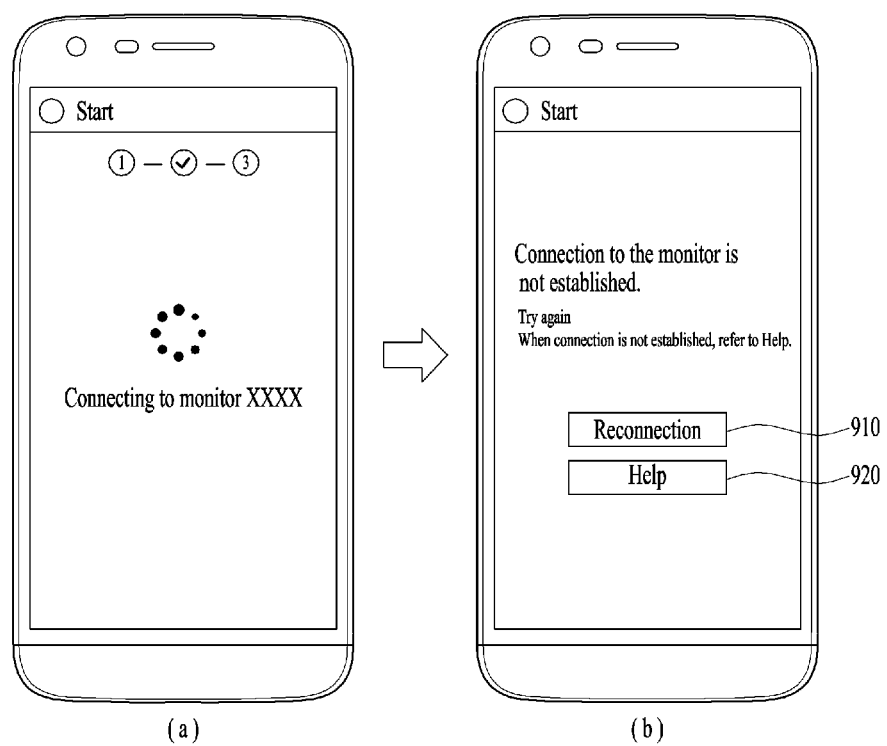
FIG. 9 is a diagram showing another example of an error occurring when a screen control application is first executed in a mobile terminal according to an embodiment of the present invention.

FIG. 9 is a diagram showing another example of an error occurring when a screen control application is first executed in a mobile terminal according to an embodiment of the present invention.

More specifically, FIG. 9 shows the case where connection fails while connection of one of the connectable display devices is established in the embodiment of FIG. 6(d).

Referring to FIG. 9(a), the mobile terminal may attempt connection to the connectable display device for a predetermined time and recognize connection failure. In this case, as shown in FIG. 9(b), the mobile terminal may output a message indicating failure of connection with the display device. In addition, the mobile terminal may output a reconnection icon 910 for reconnection with the display device and a help icon 920.

Figure 10:
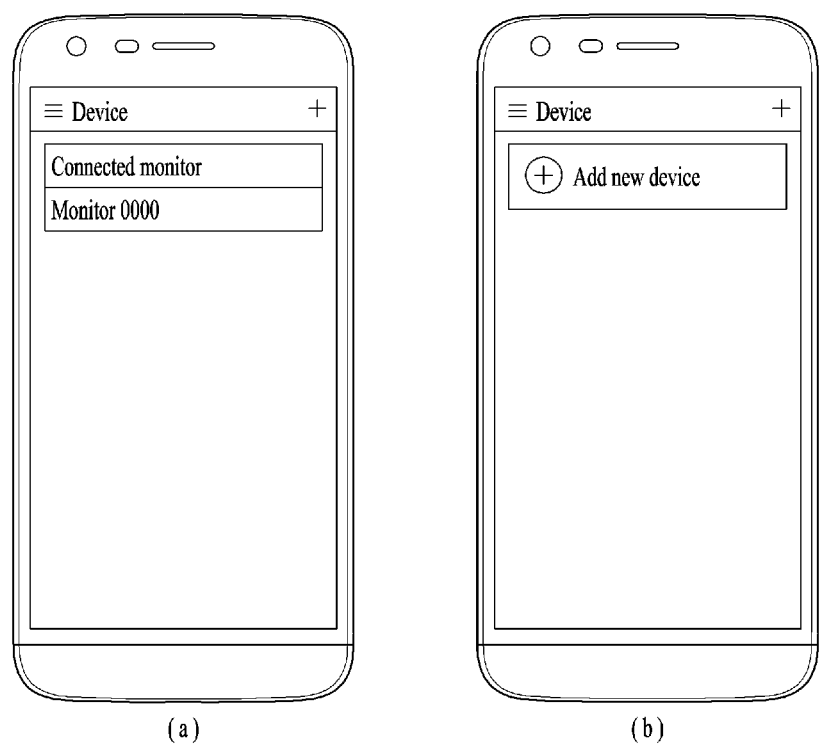
FIG. 10 is a diagram showing a connected display device at a mobile terminal according to an embodiment of the present invention.

FIG. 10 is a diagram showing a connected display device at a mobile terminal according to an embodiment of the present invention.

Referring to FIG. 10(a), the mobile terminal may output a list of connected monitors. In addition, when an input signal for a "+" icon located at a right upper end is sensed, the mobile terminal may further connect another device in addition to the connected display device.

Meanwhile, in FIG. 10(b), there is no display device connected to the mobile terminal. When an input signal for "add a new device" is sensed, the mobile terminal may attempt connection with a new display device.

Current Screen State Control Through First Display Region

Hereinafter, FIGS. 11 to 14 show a method of controlling the screen of at least one external device, which is currently being output on the display device, when an input signal for the first display region is sensed.

Figure 11:
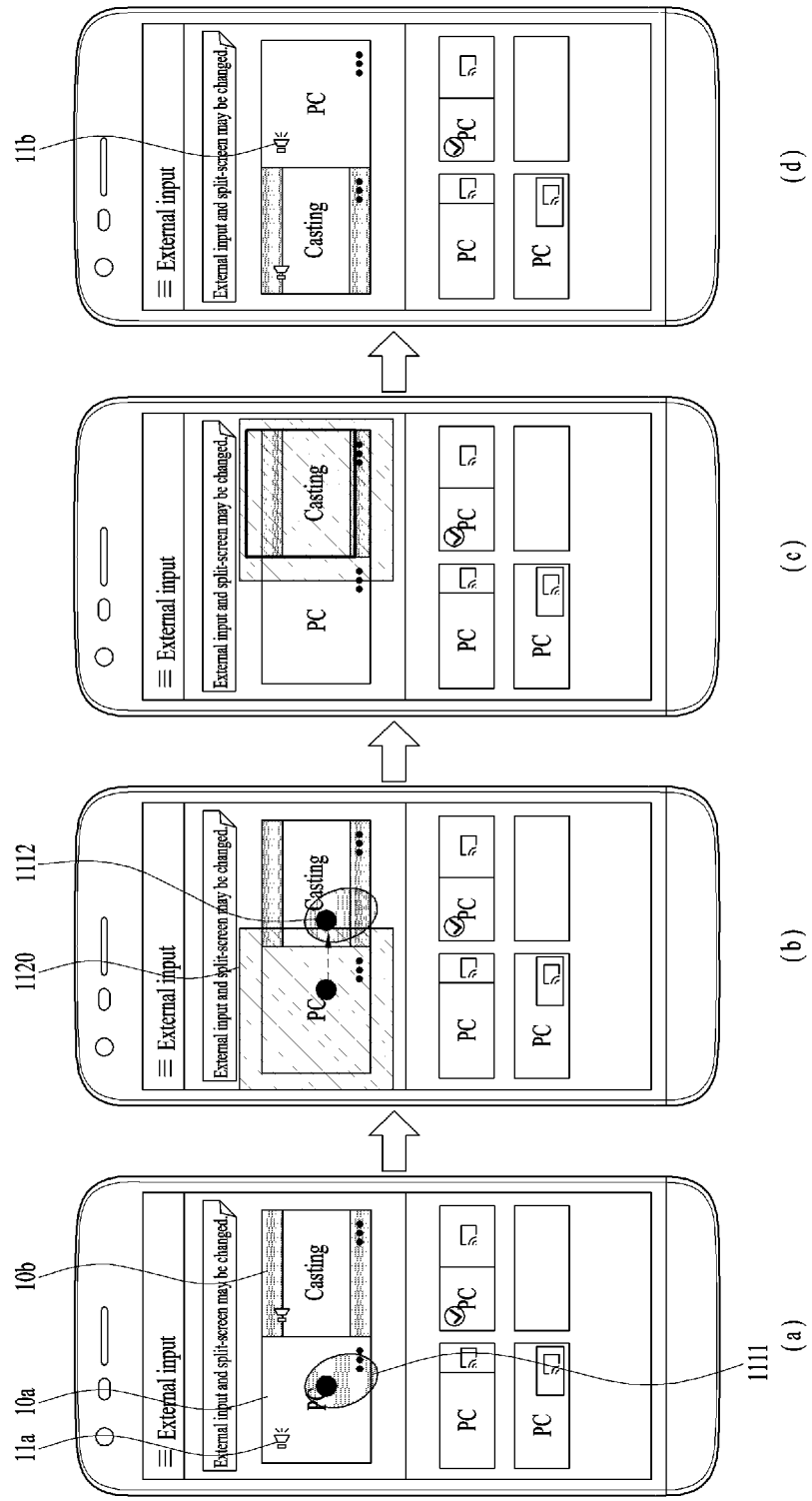
FIG. 11 is a diagram showing an example of controlling a first display region on a mobile terminal according to an embodiment of the present invention.

FIG. 11 is a diagram showing an example of controlling a first display region on a mobile terminal according to an embodiment of the present invention. More specifically, the embodiment of FIG. 11 shows a method of changing the output positions of two external devices which are output on the display device.

Referring to FIG. 11(a), the mobile terminal may show a state in which content displayed on the first external device and the second external device are currently displayed on the display device in the first external device region 10a and the second external device region 10b. For example, in the embodiment of FIG. 11, a PC is output in the first external device region 10a and a streaming device is output in the second external device region 10b. In addition, the mobile terminal may show a state in which sound generated by the first external device is output on the display device through a speaker icon 11a.

At this time, the mobile terminal may sense a first input signal 1111 for the first external device region 10a. Here, the first input signal 1111 may correspond to long press touch input. As shown in FIG. 11(b), the mobile terminal may perform control to output a region indicator 1120 in the first external device region 10a in correspondence with the first input signal 1111. For example, the region indicator 1120 indicates that one of a plurality of external device regions is selected and may be output in the external device region and a region close thereto.

In addition, the mobile terminal may sense a second input signal 1112 in a state of outputting the region indicator 10a in the first external device region 10a. Here, the second input signal 1112 may correspond to drag touch input. As shown in FIG. 11(c), the mobile terminal may move the position of the region indicator 1120 to the second external device region 10b in correspondence with the second input signal 1112.

That is, as shown in FIG. 11(d), the screen of the streaming device may be output in the first external device region 10a and the screen of the PC may be output in the second external device region 10b. In addition, the mobile terminal may transmit a control signal for changing the output positions of the first external device and the second external device to the display device.

In addition, as shown in FIG. 11(d), the mobile terminal may remove the region indicator 1120 when the input signal for the region indicator 1120 is not sensed within the predetermined time.

Therefore, the user may easily change the output positions of the external devices, which are being output on the display device, through the mobile terminal.

Figure 12:
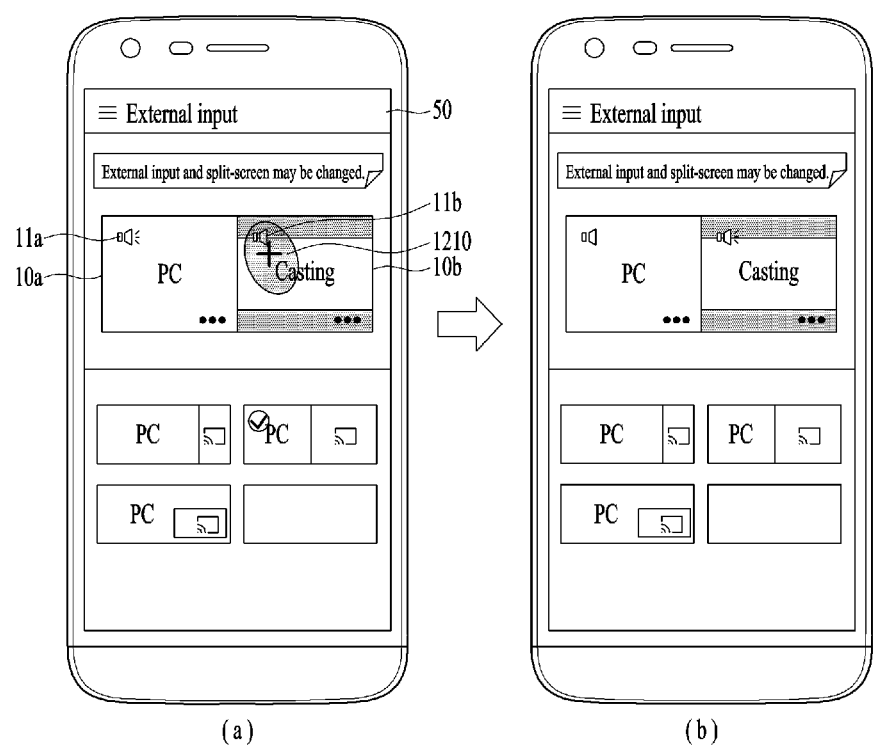
FIG. 12 is a diagram showing another example of controlling a first display region on a mobile terminal according to an embodiment of the present invention.

FIG. 12 is a diagram showing another example of controlling a first display region on a mobile terminal according to an embodiment of the present invention. More specifically, the embodiment of FIG. 12 shows a method of changing a source device of sound output from the display device.

Referring to FIG. 12(a), the mobile terminal shows a state in which sound of the external device output in the first external device region is currently output through the display device. More specifically, the mobile terminal may show a state in which sound of the PC is currently output to the user in the form of the sound indicator 11a included in the first external device region 10a.

Meanwhile, the mobile terminal may sense an input signal 1210 for the sound indicator 11b included in the second external device region 10b. For example, the input signal 1210 may correspond to single touch input. In this case, as shown in FIG. 12(b), the mobile terminal may perform control to output sound of the second external device through the display device in correspondence with the input signal 1210. In addition, the mobile terminal may change the icon shapes of the sound indicators 11a and 11b in correspondence with the input signal 1210 to indicate that sound of the second external device is being output.

Figure 13:
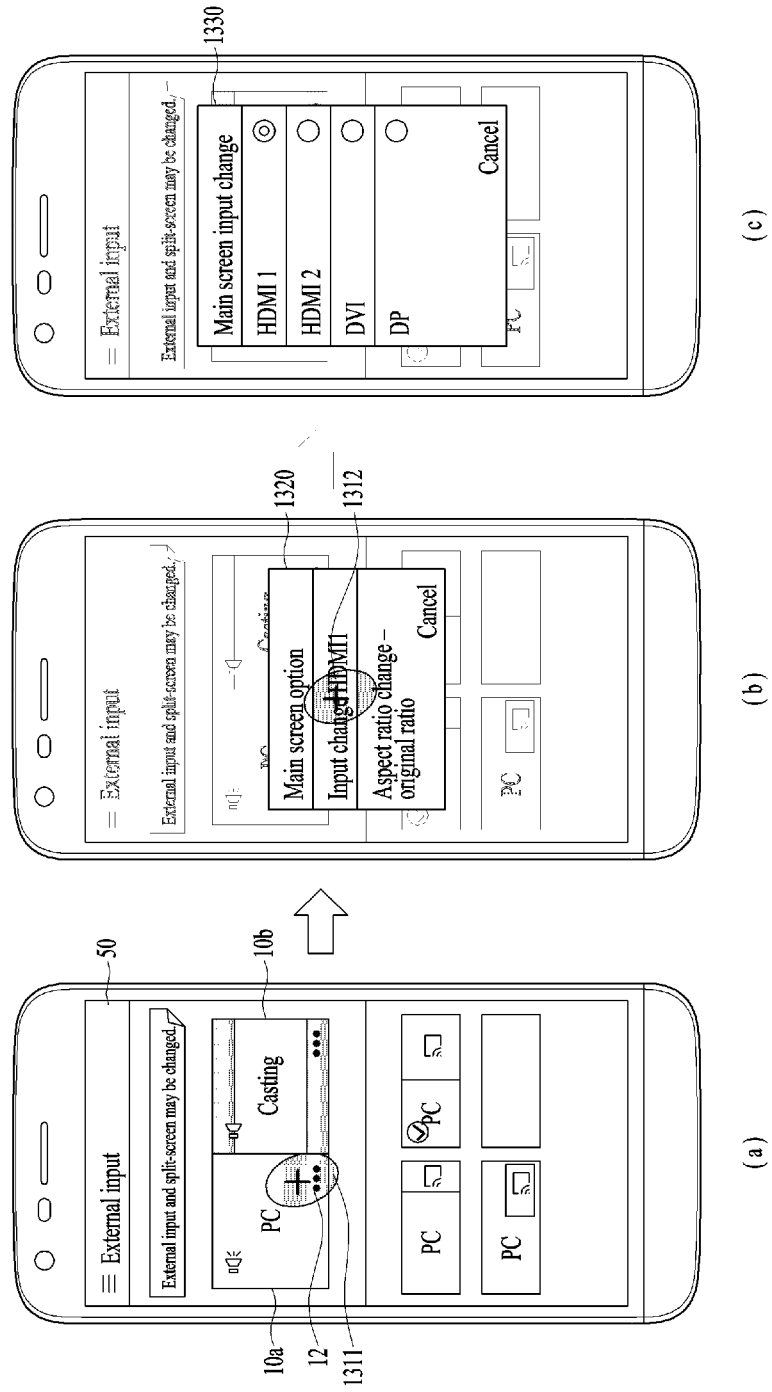
FIG. 13 is a diagram showing another example of controlling a first display region on a mobile terminal according to an embodiment of the present invention.

FIG. 13 is a diagram showing another example of controlling a first display region on a mobile terminal according to an embodiment of the present invention. More specifically, the embodiment of FIG. 13 shows a method of changing an input method of an external device which is being output on a display device.

Referring to FIG. 13(a), the mobile terminal may sense a first input signal 1311 for a screen control icon 12 output in the first external device region 10a. For example, the first input signal 1311 corresponds to single touch input. In this case, as shown in FIG. 13(b), the mobile terminal may output a screen option popup 1320. In the present invention, the screen option popup 1320 includes an input change menu and an aspect ratio change menu without being limited thereto and may include various menus.

In addition, referring to FIG. 13(b), the screen option popup 1320 may output current input and a current aspect ratio in the input change menu and the aspect ratio menu, respectively.

For example, the current input of the first external device is performed through "HDMI 1" and the current aspect ratio corresponds to "original ratio".

In addition, the mobile terminal may sense a second input signal 1312 for the input change menu. For example, the second input signal 1312 corresponds to single touch input. In this case, as shown in FIG. 13(c), the mobile terminal may output a screen input change popup 1330. In the present invention, the screen input change popup 1330 includes an HDMI (High Definition Multimedia Interface) 1 menu, an HDMI 2 menu, a DVI (Digital Visual Interface) menu, and a DP (Display Port) menu without being limited thereto and may include various monitor cable terminals.

In addition, although not shown in FIG. 13, when an input signal for one menu of the screen input change popup 1330 is generated, the mobile terminal may perform control to change an input method for the first external device of the display device. In addition, although not shown in FIG. 13, when the input signal for the input method change menu in the screen option popup of the second external device region 10b is sensed, the mobile terminal may perform control to change the input method for the second external device on the display device.

Figure 14:
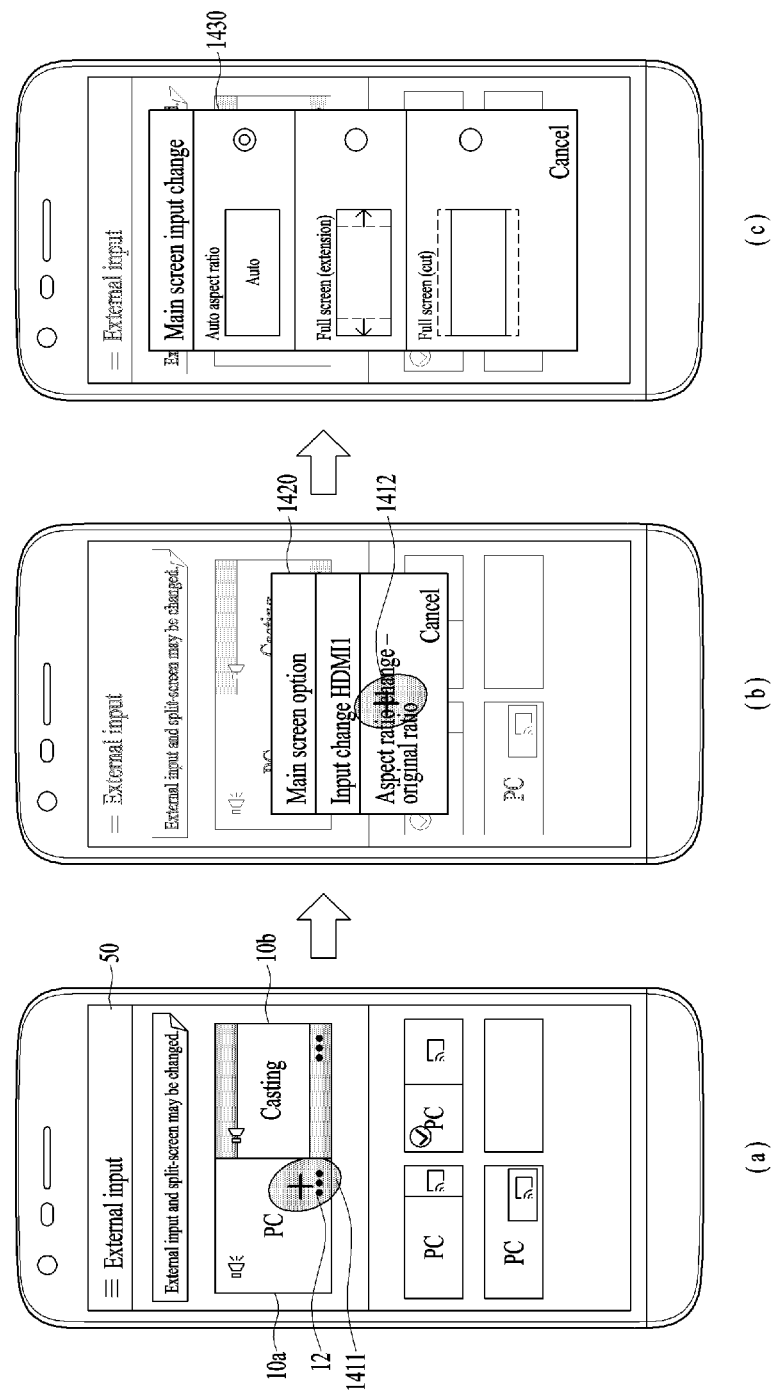
FIG. 14 is a diagram showing another example of controlling a first display region on a mobile terminal according to an embodiment of the present invention.

FIG. 14 is a diagram showing another example of controlling a first display region on a mobile terminal according to an embodiment of the present invention. More specifically, the embodiment of FIG. 14 shows a method of changing the aspect ratio of the external device output on the display device. In the embodiment of FIG. 14, repeated description of the FIG. 13 will be omitted.

Referring to FIG. 14(a), the mobile terminal may sense a first input signal 1411 for the screen control icon 12 output in the first display region 10a. In addition, the mobile terminal may output a screen option popup 1420 in correspondence with the first input signal 1411.

In addition, referring to FIG. 14(b), the mobile terminal may sense a second input signal 1412 for the aspect ratio change menu. In this case, as shown in FIG. 14(c), the mobile terminal may output an aspect ratio change popup 1430. In the present invention, the aspect ratio change popup 1430 includes an auto aspect ratio menu, a full screen (extension) and a full screen (cut) without being limited thereto and may include various aspect ratio menus.

In addition, although not shown in FIG. 14, when an input signal for one menu of the aspect ratio change popup 1430 is sensed, the mobile terminal may change the aspect ratio of the first external device output on the display device. In addition, although not shown in FIG. 14, when the input signal for the aspect ratio change menu of the screen option popup of the second external device region 10b is sensed, the mobile terminal may perform control to change the aspect ratio of the second external device on the display device.

Split-Screen Control Through Split-Screen List

Hereinafter, FIGS. 15 to 18 show a method of controlling output of the screen of at least one external device currently output on the display device when an input signal for the second display region is sensed.

Figure 15:
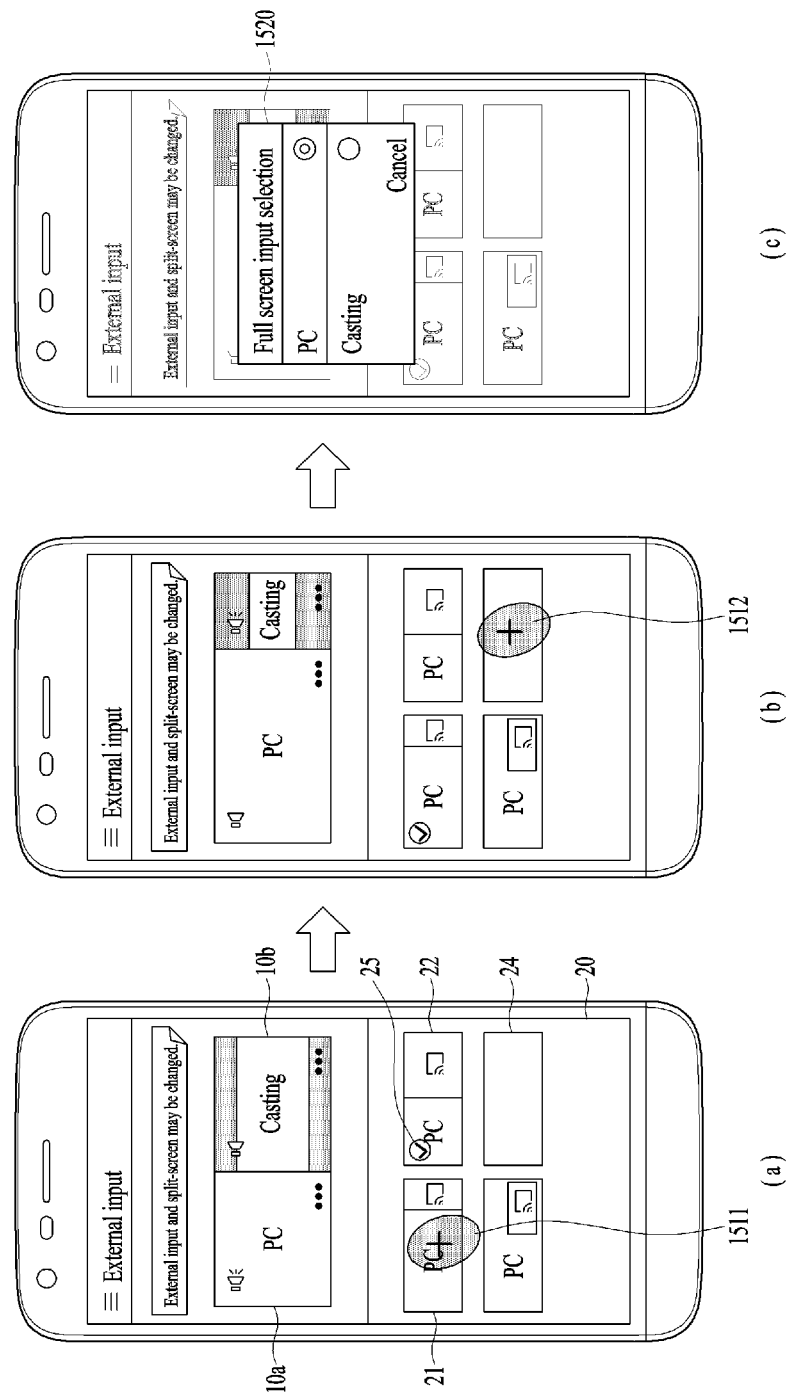
FIG. 15 is a diagram showing an example of controlling a second display region on a mobile terminal according to an embodiment of the present invention.

FIG. 15 is a diagram showing an example of controlling a second display region on a mobile terminal according to an embodiment of the present invention. More specifically, the embodiment of FIG. 15 shows a method of changing the split-screen ratio of at least one external device output on the display device.

Referring to FIG. 15(a), the mobile terminal may output a split-screen list in the second display region 20. In addition, a split-screen form currently output on the display device of the split-screen list may be indicated through an icon 25. Referring to FIG. 15, it can be seen that the display device currently connected to the mobile terminal is set to a second split-screen option 22 in which the screen of the PC and the screen of the streaming device are output with a ratio of 1:1.

At this time, the mobile terminal may sense a first input signal 1511 for the first aspect ratio option 21. For example, the first input signal 1511 corresponds to single touch input. In this case, as shown in FIG. 15(b), in correspondence with the first input signal 1511, the aspect ratios of the first external device region 10a and the second external device region 10b of the first display region may be adjusted and output according to the first aspect ratio option 21. In addition, the mobile terminal may transmit a control signal to the display device for output of the display device with the second aspect ratio option 21.

Meanwhile, the mobile terminal may sense a second input signal 1512 for a fourth aspect ratio option 24. For example, the second input signal 1512 corresponds to single touch input. In addition, the fourth aspect ratio option 24 corresponds to output of one of the plurality of external devices on the full screen. In this case, as shown in FIG. 15(c), control may be performed such that a screen selection popup 1520 is output in correspondence with the second input signal 1512. The screen selection popup 1520 may include a list of a plurality of external devices connected to the display device. The user may select a device to be used on the full screen from the list of external devices output in the screen selection popup 1520. In addition, in the above-described embodiment, the examples of the first input signal 1511 and the second input signal 1512 may be independently performed.

Figure 16:
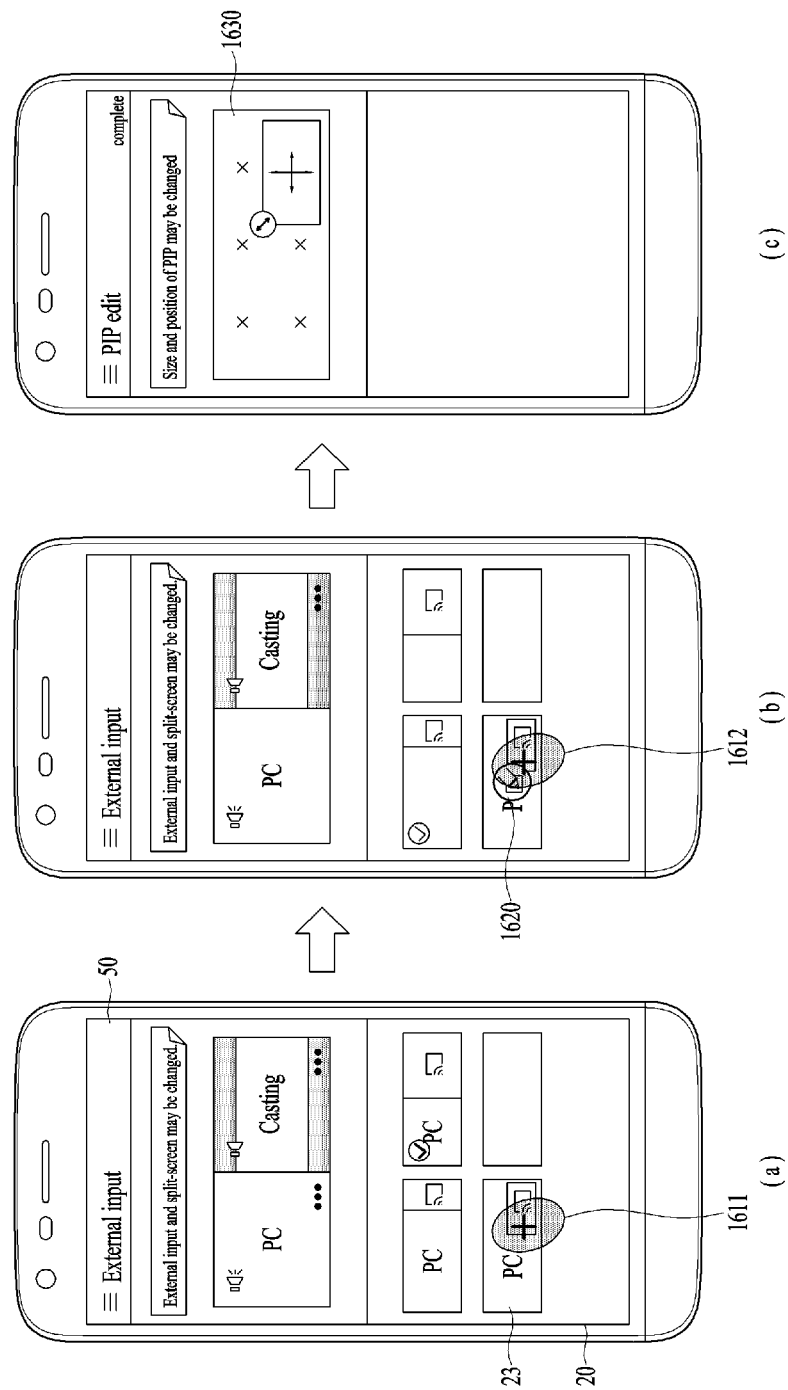
FIG. 16 is a diagram showing another example of controlling a second display region on a mobile terminal according to an embodiment of the present invention.

FIG. 16 is a diagram showing another example of controlling a second display region on a mobile terminal according to an embodiment of the present invention. More specifically, the embodiment of FIG. 16 shows a method of deciding the position or size of the screen of an external device having a small size when the screens of a plurality of external devices are not split with the same ratio in the display device.

Referring to FIG. 16(a), the mobile terminal may perform control to output the screens of two external devices on the display device with the same ratio. At this time, the mobile terminal may sense a first input signal 1611 for the third aspect ratio option 23 of the aspect ratio option list. For example, the first input signal 1611 may correspond to long press touch input.

In this case, as shown in FIG. 16(b), an edit icon 1620 may be output in the third aspect ratio option 23 in correspondence with the first input signal 1611. In addition, the mobile terminal may perform control to output the edit screen 1630, when a second input signal 1612 for the edit icon 1620 is sensed. At this time, the mobile terminal may output an edit screen 1630 as a lower layer or a lower depth, not on the home screen 50. In addition, change in size and position of the PIP screen on the edit screen 1630 will be described with reference to FIGS. 17 and 18.

FIG. 17 is a diagram showing an example of controlling an aspect ratio option output in the second display region in the embodiment of FIG. 16. More specifically, the embodiment of FIG. 17 shows a method of controlling a screen size on the edit screen 1630.

Referring to FIG. 17(a), the mobile terminal may sense drag-and-drop input for a screen 1710 included in the edit screen 1630. More specifically, the mobile terminal may sense drag-and-drop input starting in the edit region of the screen 1710. In this case, in correspondence with the drop position of drag-and-drop input, the mobile terminal may perform control to increase the size of the screen 1710.

Meanwhile, the mobile terminal may pre-set the controllable size of the screen 1710. For example, as shown in FIG. 17(b), the mobile terminal may set the size of the screen 1710 to three sizes 1711, 1712 and 1713. In addition, the mobile terminal may control the screen 1710 to have one of the three sizes according to user input of FIG. 17(a). However, unlike the embodiment of FIG. 17, the mobile terminal may set various sizes.

FIG. 18 is a diagram showing an example of controlling an aspect ratio option output in the second display region in the embodiment of FIG. 16. More specifically, the embodiment of FIG. 18 shows a method of controlling a screen position on the edit screen 1630.

Referring to FIG. 18(a), the mobile terminal may sense an input signal 1820 for a screen 1810 included in the edit screen 1630. For example, if the input signal is drag touch and drop input 1820a, the mobile terminal may perform control to output a preview 1811 of the screen 1810 at a specified position. In addition, the mobile terminal may move and output the screen 1810 in correspondence with the drop position after outputting the preview 1811.

As another example, if the input signal is flicking input 1820b, the mobile terminal may immediately move and output the screen 1810 without providing the preview.

Meanwhile, the mobile terminal may pre-set the movable position of the screen 1810. For example, as shown in FIG. 18(b), the mobile terminal may set the position of the screen 1810 to six positions. Unlike the embodiment of FIG. 18, the mobile terminal may set various positions.

Other Menu of Screen Control Application

Figure 19:
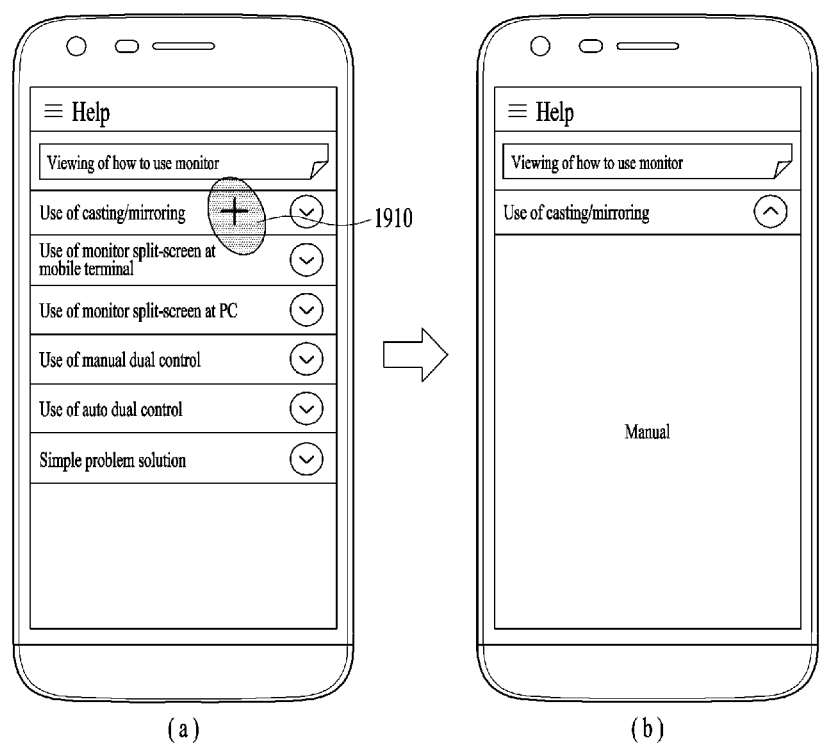
FIG. 19 is a diagram showing a help menu of a screen control application of a mobile terminal according to an embodiment of the present invention.

FIG. 19 is a diagram showing a help menu of a screen control application of a mobile terminal according to an embodiment of the present invention.

When an input signal for the help of the menu tab of the screen control application is sensed in FIG. 5, the mobile terminal may output a help screen. In addition, as shown in FIG. 19(a), when an input signal 1910 for one item of a help list is sensed, the mobile terminal may output a detailed manual.

Figure 20:
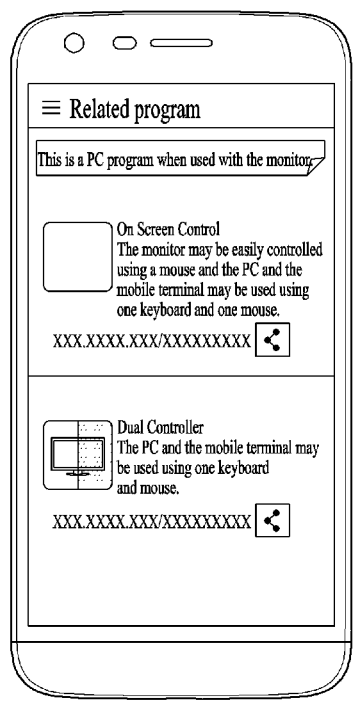
FIG. 20 is a diagram showing a related program menu of a screen control application of a mobile terminal according to an embodiment of the present invention.

FIG. 20 is a diagram showing a related program menu of a screen control application of a mobile terminal according to an embodiment of the present invention.

When an input signal for a related program of the menu tab of the screen control application described with reference to FIG. 5 is sensed, the mobile terminal may output a related program screen. In addition, as shown in FIG. 20, the mobile terminal may output programs for control when a plurality of screens is output on the display device through split-screen, as the related programs.

Figure 21:
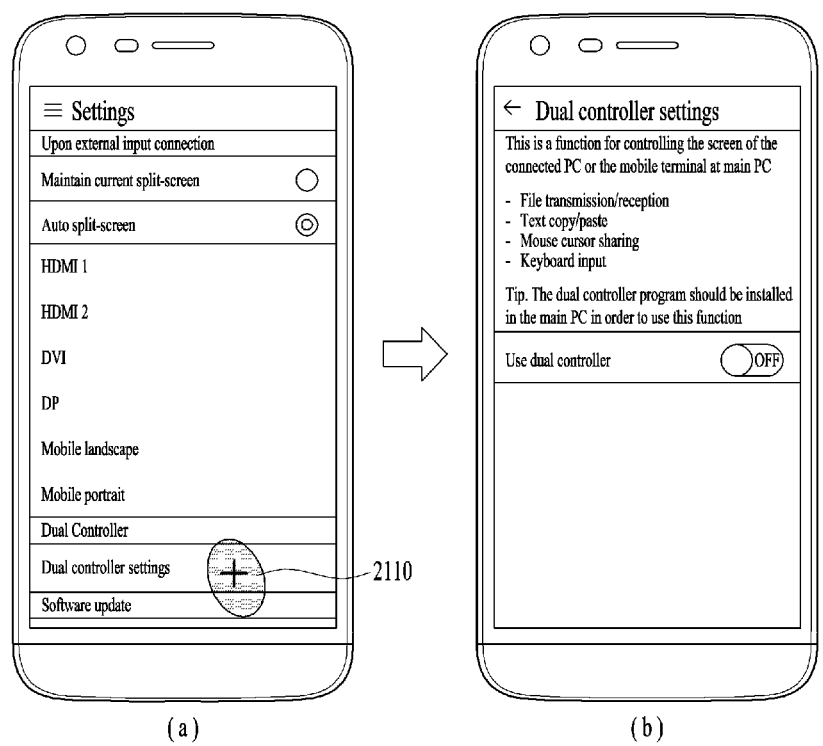
FIG. 21 is a diagram showing a setting menu of a screen control application of a mobile terminal according to an embodiment of the present invention.

FIG. 21 is a diagram showing a setting menu of a screen control application of a mobile terminal according to an embodiment of the present invention.

When an input signal for setting of the menu tab of the screen control application described with reference to FIG. 5 is sensed, the mobile terminal may output a setting screen. In addition, as shown in FIG. 21, the mobile terminal may output a detailed setting menu when an input signal 2110 for one item of a setting list is sensed.

Figure 22:
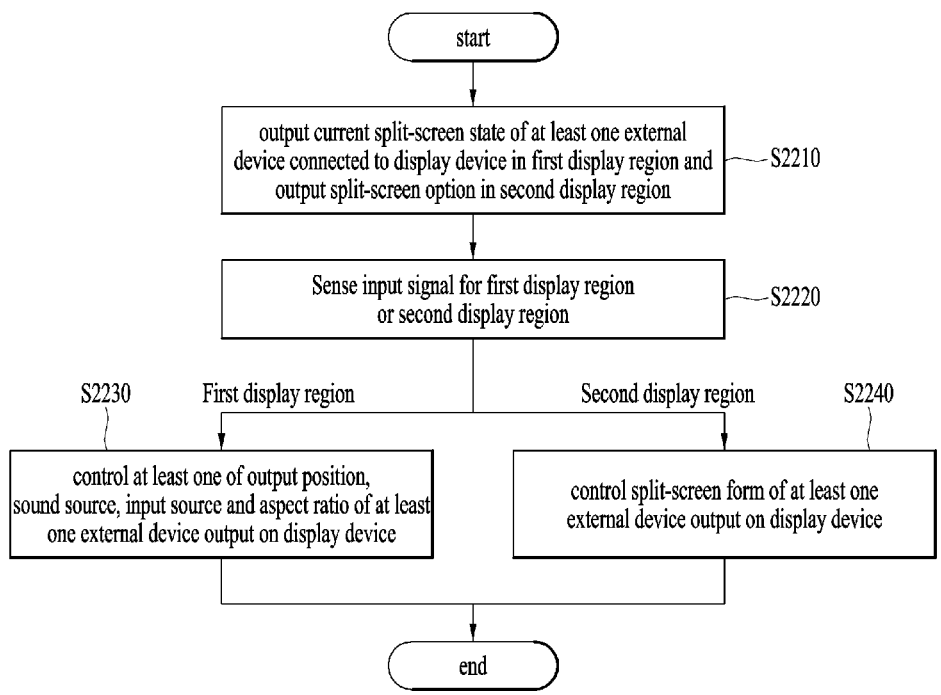
FIG. 22 is a diagram showing a method of controlling a mobile terminal according to an embodiment of the present invention.

FIG. 22 is a diagram showing a method of controlling a mobile terminal according to an embodiment of the present invention. Steps of FIG. 22 may be controlled by the controller 240 of the mobile terminal of FIG. 2.

First, the mobile terminal may perform control to output the current split-screen state of at least one external device connected to the display device in the first display region and to output a split-screen option of the at least one external device in the second display region (S2210). As described above with reference to FIG. 4, the split-screen state may include an external device region, a sound region and a screen option region. In addition, the screen option region may include an input change menu and an aspect ratio menu.

Next, the mobile terminal may sense an input signal for the first display region or the second display region (S2220). For example, the input signal may include single tab touch, double touch, drag-and-drop touch, flicking touch, long press touch, etc.

In step S2220, when the input signal is sensed in the first display region, the mobile terminal may control at least one of the output position, the sound source, the input source and the aspect ratio of at least one external device output on the display device (S2230). As described above with reference to FIG. 11, when drag touch input for the external device region is sensed, the mobile terminal may change and output the positions of the first external device region and the second external device region. In addition, as described above with reference to FIG. 12, when the input signal for the sound region of the second external device is sensed, the mobile terminal may change the sound source device to the second external device.

Meanwhile, when the input signal is sensed in the second display region in step S2220, the mobile terminal may control the split-screen form of at least one external device output on the display device (S2240). As described above with reference to FIG. 15, when input of selecting one of the split-screen options is sensed, the mobile terminal may change and output split-screen of the first external device region and the second external device region output in the first display region according to the selected split-screen option. In addition, the mobile terminal may transmit a signal for controlling output of the screen of the external device to the display device according to the selected split-screen option.

The present invention may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller 180 of the terminal. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is industrially applicable to a mobile terminal and is repeatedly applicable.

The invention claimed is:

1. A mobile terminal comprising:
    a display unit including a first display region and a second display region;
    a wireless communication unit configured to transmit and receive a signal to and from a display device; and
    a controller configured to:
        perform control to output a current split-screen state of at least one external device output on the display device in the first display region, and
        perform control to output at least one split-screen option for the at least one external device in the second display region,
        wherein the current split-screen state of the first display region includes at least one of a first region indicating an output state of the at least one external device on the display device, a second region indicating a sound source of the display device, or a third region indicating a screen option of the at least one external device.

2. The mobile terminal according to claim 1, wherein the controller is further configured to control the wireless communication unit to transmit a control signal for changing an input position of the at least one external device to the display device through the wireless communication unit, when an input signal for the first region is sensed.

3. The mobile terminal according to claim 1, wherein the controller is further configured to control the wireless communication unit to transmit a control signal for changing a sound source device in the display device through the wireless communication unit, when an input signal for the second region is sensed.

4. The mobile terminal according to claim 1, wherein, when an input signal for the third region is sensed, the controller is further configured to control the display unit to output an input change menu and an aspect ratio menu of an external device corresponding to an external device region in which the input signal is sensed.

5. The mobile terminal according to claim 4, wherein the controller is further configured to control the wireless communication unit to transmit a control signal for changing an aspect ratio of the at least one external device to the display device through the wireless communication unit, when an input signal for the aspect ratio menu is sensed.

6. The mobile terminal according to claim 1, wherein the controller is further configured to control the wireless communication unit to transmit a control signal for changing split-screen of the at least one external device to the display device through the wireless communication unit, when an input signal for selecting one of the at least one split-screen option is sensed.

7. The mobile terminal according to claim 1, wherein the controller is further configured to control the display unit to output the first display region and the second display region for controlling an output form of the at least one external device while mirroring content of the at least one external device on the display device.

8. The mobile terminal according to claim 1, wherein the wireless communication unit transmits and receives a screen control signal to and from the display device using a Bluetooth method.

9. A method of controlling a mobile terminal, the method comprising:
    outputting a current split-screen state of at least one external device connected to a display device in a first display region and outputting a split-screen option of the at least one external device in a second display region;
    transmitting a control signal of at least one of an output position, a sound source, an input source and an aspect ratio of at least one external device output on the display device to the display device, when an input signal for the first display region is sensed; and
    transmitting, to the display device, a signal for controlling a split-screen form of at least one external device output on the display device, when an input signal for the second display region is sensed, wherein the current split-screen state of the first display region includes at least one of a first region indicating an output state of the at least one external device on the display device, a second region indicating a sound source of the display device, or a third region indicating a screen option of the at least one external device.

\* \* \* \* \*